US009652149B2

(12) United States Patent
Miyamoto

(10) Patent No.: US 9,652,149 B2

(45) Date of Patent: May 16, 2017

(54) INPUT DEVICE AND ELECTRONIC DEVICE

(71) Applicant: KYOCERA Document Solutions Inc., Osaka (JP)

(72) Inventor: Keita Miyamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 297 days.

(21) Appl. No.: 14/486,046

(22) Filed: Sep. 15, 2014

(65) Prior Publication Data

US 2015/0089433 A1 Mar. 26, 2015

(30) Foreign Application Priority Data

Sep. 25, 2013 (JP) ................................ 2013-198751

(51) Int. Cl.

| | |
|---|---|
| ***G06F 3/0488*** | (2013.01) |
| ***G06F 3/0484*** | (2013.01) |
| ***G06F 17/24*** | (2006.01) |
| ***G03G 15/00*** | (2006.01) |

(52) U.S. Cl.

CPC ..... *G06F 3/04886* (2013.01); *G03G 15/5016* (2013.01); *G06F 3/0484* (2013.01); *G06F 3/04883* (2013.01); *G06F 17/24* (2013.01)

(58) Field of Classification Search

CPC .... G06F 3/04886; G06F 3/0484; G06F 17/24; G03G 15/5016

See application file for complete search history.

(56) References Cited

U.S. PATENT DOCUMENTS

| | | | | |
|---|---|---|---|---|
| 6,181,338 | B1 * | 1/2001 | Brodhun ............... | G06F 3/0481 715/798 |
| 8,332,770 | B2 | 12/2012 | Shin et al. | |
| 2005/0231486 | A1 * | 10/2005 | Wiggeshoff ........... | G06F 3/0234 345/168 |
| 2008/0316212 | A1 * | 12/2008 | Kushler ................ | G06F 3/0482 345/467 |

(Continued)

FOREIGN PATENT DOCUMENTS

| | | | |
|---|---|---|---|
| CN | 1658133 | A | 8/2005 |
| CN | 102419683 | A | 4/2012 |
| JP | 2007-026339 | A | 2/2007 |

OTHER PUBLICATIONS

Kumar, "Text Alignment—MS Word 2010 Tutorial," Feb. 18, 2013, http://www.1wordtut.com/2013/02/text-alignment-ms-word-2010.html.*

(Continued)

*Primary Examiner* — Ryan Barrett

(74) *Attorney, Agent, or Firm* — Studebaker & Brackett PC

(57) ABSTRACT

An input device includes a storage section, a display section, a touch sensor, a control section, and a display switch section. The control section switches the display state of a to-be-deleted symbol string on the display section to any one of a second half hiding state, a first half hiding state, and a full display state every time the display switch section is pressed during touch operation on the display section by a user. The second half hiding state is to hide a second half symbol string, out of the to-be-deleted symbol string, displayed behind a deletion reference position. The first half hiding state is to hide a first half symbol string, out of the to-be-deleted symbol string, displayed before the deletion reference position. The full display state is to display the to-be-deleted symbol string in full.

5 Claims, 7 Drawing Sheets

71
72
T
73
40
ABCDEFGH 71
72
T
73
40
ABCD

(56) References Cited

U.S. PATENT DOCUMENTS

2009/0044139 A1 2/2009 Shin et al.
2010/0248788 A1* 9/2010 Yook ..................... G06F 3/0481 455/566
2010/0253629 A1* 10/2010 Orsley .................. G06F 3/0202 345/168
2010/0293460 A1* 11/2010 Budelli ............... G06F 3/04883 715/702
2010/0333027 A1* 12/2010 Martensson ........ G06F 3/04886 715/833
2011/0099515 A1* 4/2011 Doney ............. G06F 17/30309 715/810
2011/0122081 A1* 5/2011 Kushler ................ G06F 3/0233 345/173
2012/0081292 A1* 4/2012 Sirpal ................... G06F 1/1616 345/169
2012/0327003 A1* 12/2012 Matsumura ......... G06F 3/04883 345/173
2013/0080963 A1* 3/2013 Hong .................. G06F 3/04886 715/773
2013/0127703 A1* 5/2013 Wendt ................... G06F 17/211 345/156
2014/0078063 A1* 3/2014 Bathiche ............... G06F 3/0234 345/168
2014/0108989 A1* 4/2014 Bi ....................... G06F 3/04886 715/773
2014/0139440 A1* 5/2014 Qu .......................... G06F 3/018 345/169
2014/0282150 A1* 9/2014 Wagner ................. G06F 3/0482 715/765
2015/0085306 A1* 3/2015 Miyamoto ............ G06F 17/241 358/1.11
2015/0348550 A1* 12/2015 Zhang ..................... G06F 3/167 704/235
2015/0370477 A1* 12/2015 Kim ...................... G06F 3/0486 715/769
2017/0018112 A1* 1/2017 Vaganov ................. G06T 15/10
2017/0032553 A1* 2/2017 O'Donovan ........... G06N 7/005

OTHER PUBLICATIONS

Sexton, "IsThreeState—2,000 Things You Should Know About WPF," Jul. 1, 2013, https://wpf.2000things.com/tag/isthreestate/.*

An Office Action issued by the Chinese Patent Office on Mar. 1, 2017, which corresponds to Chinese Patent Application No. 201410475330.6 and is related to U.S. Appl. No. 14/486,046; 9 pp.

* cited by examiner

INPUT DEVICE AND ELECTRONIC DEVICE

INCORPORATION BY REFERENCE

The present application claims priority under 35 U.S.C. §119 to Japanese Patent Application No. 2013-198751, filed Sep. 25, 2013. The contents of this application are incorporated herein by reference in their entirety.

BACKGROUND

The present disclosure relates to input devices and electronic devices.

As an input device to be mounted in an electronic device (e.g., a personal digital assistance and an image forming apparatus), there has been offered an input device in which characters are entered by using a keyboard displayed on a display section (e.g., software keyboard). When a user is to delete desired characters, the user repeats a quick press of a clear key to delete the characters on a character-by-character basis. Alternatively, the user holds down the clear key to delete the characters on the display all together.

A certain mobile terminal allows deletion of desired characters by simple operation. A certain input device provides three types of presses according to the press duration of a clear key: a quick press, a medium press, and a long press. One quick press deletes one character. One medium press deletes a line or the like. One long press collectively deletes all the characters being edited.

SUMMARY

An input device according to the present disclosure includes a storage section, a display section, a touch sensor, a control section, and a display switch section. The storage section stores a symbol string including a plurality of symbols. The display section displays the symbol string stored in the storage section. The touch sensor detects a touch position on the display section. The control section specifies a to-be-deleted symbol string and a deletion reference position based on the touch position detected by the touch sensor. The control section switches the display state of the to-be-deleted symbol string on the display section to any one of a second half hiding state, a first half hiding state, or a full display state every time the display switch section is pressed during touch operation on the display section by a user. The second half hiding state is to hide a second half symbol string, out of the to-be-deleted symbol string, displayed behind the deletion reference position. The first half hiding state is to hide a first half symbol string, out of the to-be-deleted symbol string, displayed before the deletion reference position. The full display state is to display the to-be-deleted symbol string in full.

An electronic device according to the present disclosure includes the above-described input device.

DETAILED DESCRIPTION

Hereinafter, embodiments of an input device and an electronic device according to the present disclosure will be described with reference to the accompanying drawings. However, the present disclosure is not limited to the specific embodiments described below.

First Embodiment

Figure 1:
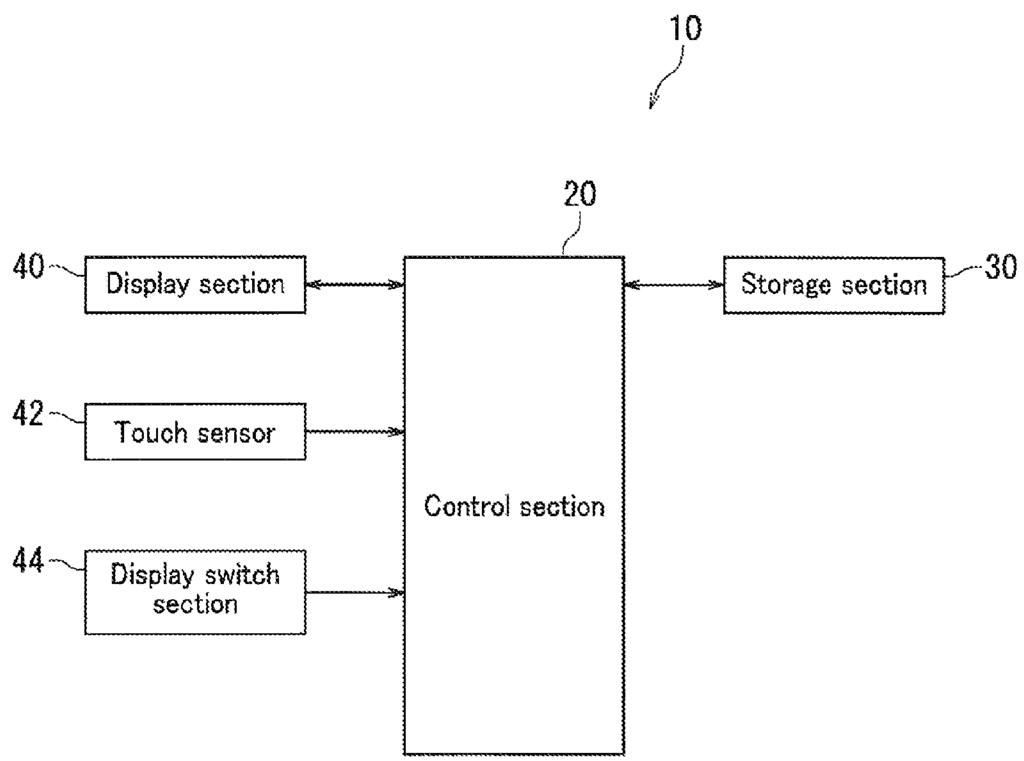
FIG. 1 is a block diagram showing an input device according to an embodiment of the present disclosure.
Figure 2A:
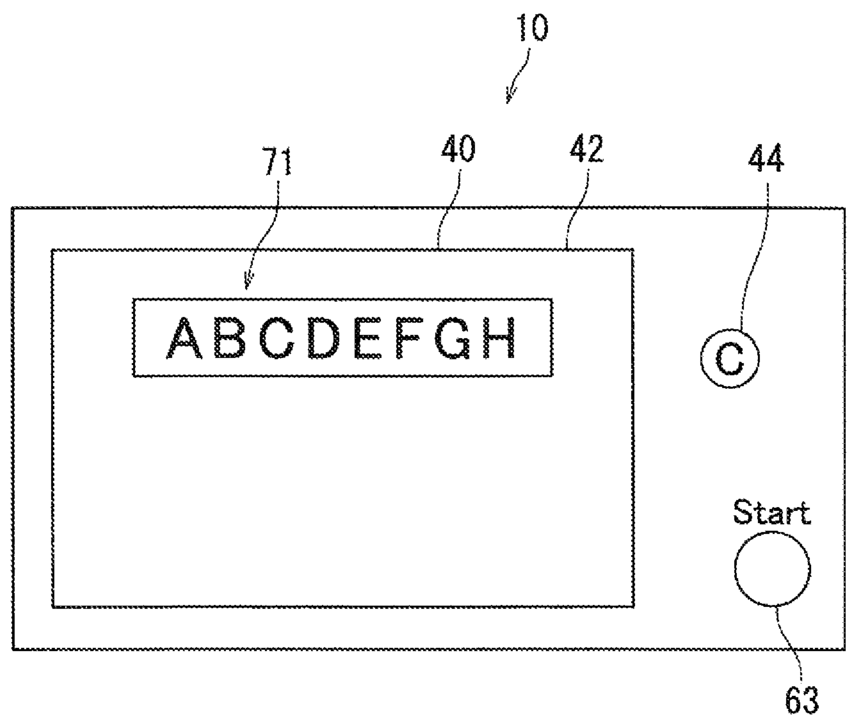
FIGS. 2A and 2B are schematic illustrations showing the input device according to the embodiment of the present disclosure.
Figure 2B:
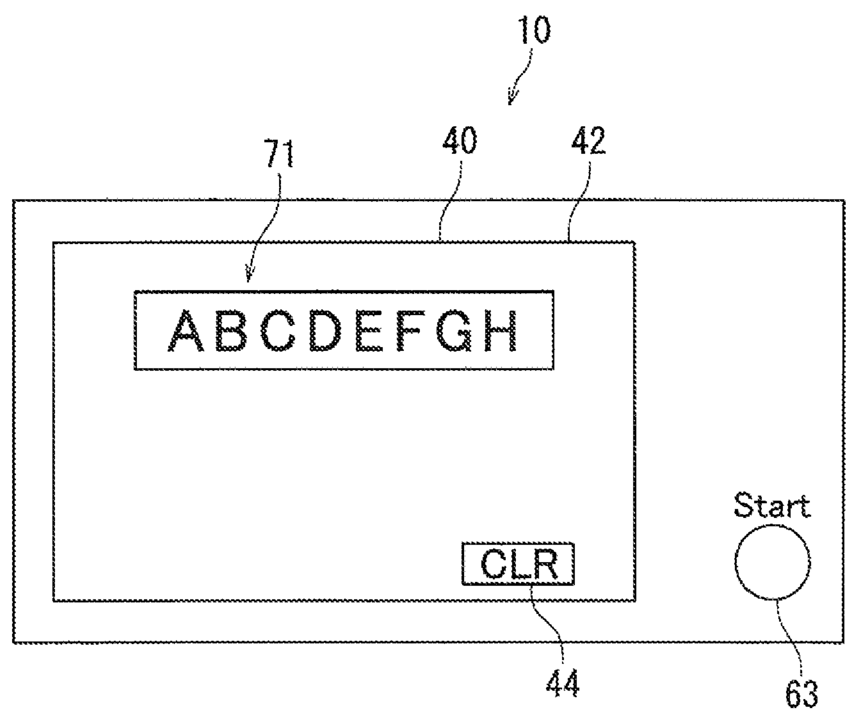

An input device 10 according to an embodiment of the present disclosure will be described with reference to FIGS. 1 and 2. FIG. 1 is a block diagram showing the input device 10 according to the first embodiment of the present disclosure. FIGS. 2A and 2B are schematic illustrations showing the input device 10 according to the first embodiment of the present disclosure.

The input device 10 includes a control section 20, a storage section 30, a display section 40, a touch sensor 42, and a display switch section 44.

The storage section 30 stores a symbol string including a plurality of symbols. For example, the symbols include Japanese Hiragana, Katakana, and Kanji; letters such as alphabets; numbers; and marks (e.g., at mark). The storage section 30 is a random access memory (RAM) and a read only memory (ROM), for example. The storage section 30 stores a symbol string entered by a user or a symbol string received through communication.

The display section 40 displays the symbol string stored in the storage section 30. The display section 40 is a liquid crystal panel, for example.

The touch sensor 42 detects a position of a touch on the display section 40 by a user.

The display switch section 44 is a clear key, for example. The display switch section 44 is a hardware key or a software key.

The control section 20 controls the display section 40 and the storage section 30. The control section 20 is a central processing unit (CPU), for example. The control section 20 switches the display state on the display section 40 every time the display switch section 44 is pressed during touch operation on the display section 40 by a user.

First, an aspect of the input device 10 in which the display switch section 44 is a hardware key will be described with reference to FIG. 2A. In the present embodiment, the input device 10 is mounted in an image forming apparatus.

The input device 10 further includes a start button 63. Once a user presses the start button 63, operation of the image forming apparatus is initiated. The display section 40 displays a symbol string 71 "ABCDEFGH". The control section 20 switches the display state on the display section 40 every time the display switch section 44 is pressed during touch operation on the display section 40 by a user. The display state switching will be described later with reference to FIGS. 3A-3D.

Next, an aspect of the input device 10 in which the display switch section 44 is a software key will be described with reference to FIG. 2B. The input device 10 shown in FIG. 2B has the same configuration as the input device 10 shown in FIG. 2A except that the display switch section 44 is a software key. Accordingly, the same description will not be repeated.

The display section 40 displays the display switch section 44. The display switch section 44 is a software keyboard. The control section 20 switches the display state on the display section 40 every time the display switch section 44 is pressed during touch operation on the display section 40 by a user. The display state switching will be described later with reference to FIGS. 3A-3D.

A method for switching the display state in the input device 10 according to the present disclosure will be described with reference to FIGS. 1 and 3. FIGS. 3A-3D are schematic illustrations showing the method for switching the display state in the input device 10 according to the embodiment of the present disclosure.

Figure 3A:
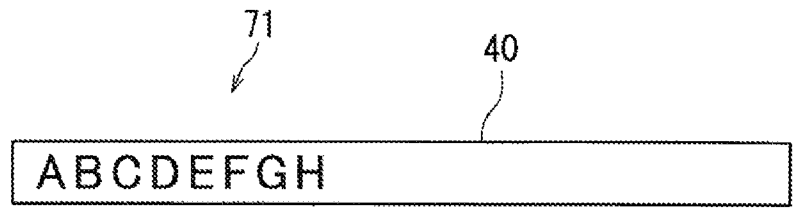
FIGS. 3A-3D are schematic illustrations showing a method for switching the display state in the input device according to the embodiment of the present disclosure.

As shown in FIG. 3A, the symbol string 71 “ABCDEFGH” is displayed on the display section 40.

Figure 3B:
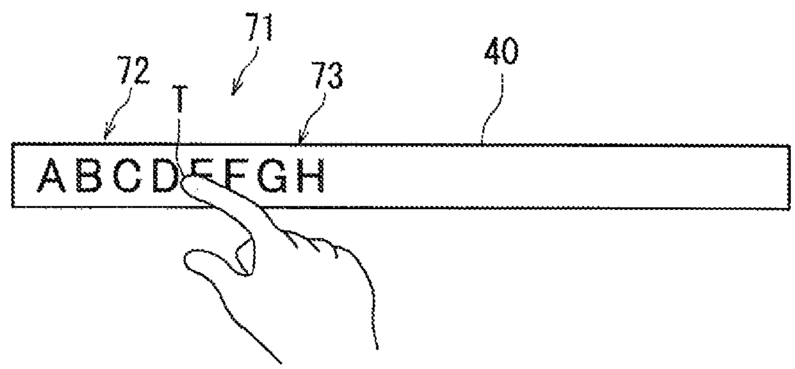

Next, as shown in FIG. 3B, a user touches a space between “D” and “E” in the symbol string 71. In response, the touch sensor 42 detects a touch position T. The touch position T lies somewhere between “D” and “E”.

The control section 20 specifies a to-be-deleted symbol string based on the touch position T. In the present embodiment, the control section 20 specifies the symbol string 71 “ABCDEFGH” as the to-be-deleted symbol string. The control section 20 also specifies a deletion reference position based on the touch position T. In the present embodiment, the control section 20 specifies the touch position T as the deletion reference position.

In the present specification, a symbol string, out of the to-be-deleted symbol string 71, displayed before the deletion reference position T is referred to as first half symbol string. Likewise, in the present specification, a symbol string, out of the to-be-deleted symbol string 71, displayed behind the deletion reference position T is referred to as second half symbol string. In the present embodiment, a symbol string “ABCD” out of the to-be-deleted symbol string “ABCDEFGH” is a first half symbol string 72, and a symbol string “EFGH” is a second half symbol string 73.

Figure 3C:
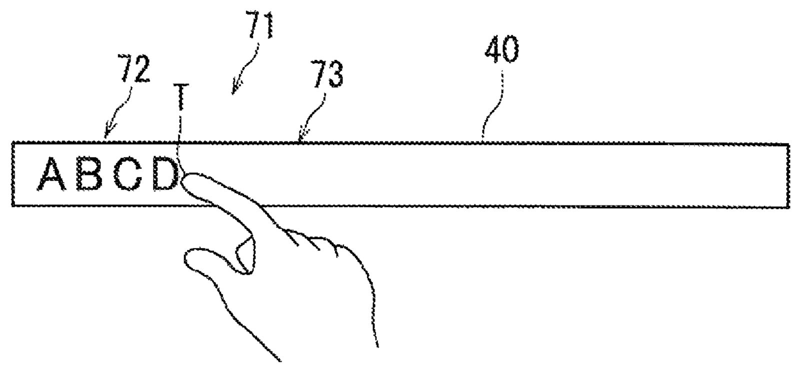

As shown in FIG. 3B, once the display switch section 44 is pressed (for the first time) during touch operation on the display section 40 by a user, the control section 20 controls the display state of the to-be-deleted symbol string 71 so that the second half symbol string 73 “EFGH” out of the to-be-deleted symbol string 71 is hidden as shown in FIG. 3C. As a result, only the first half symbol string 72 “ABCD” is displayed on the display section 40.

Figure 3D:
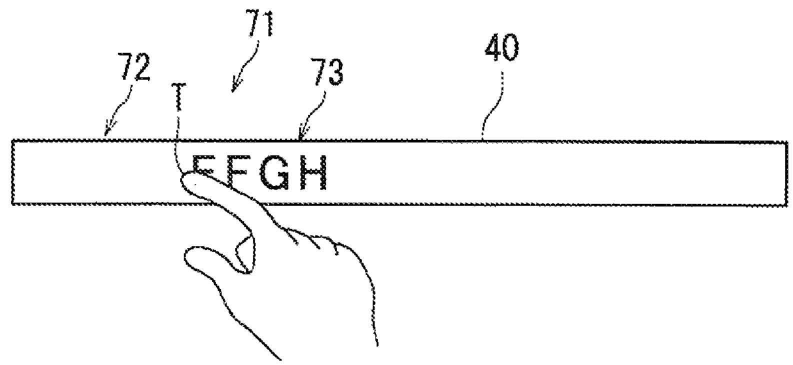

As shown in FIG. 3C, once the display switch section 44 is pressed again (for the second time) during the touch operation on the display section 40 by the user, the control section 20 controls the display state of the to-be-deleted symbol string 71 so that the first half symbol string 72 “ABCD” out of the to-be-deleted symbol string 71 is hidden as shown in FIG. 3D. As a result, only the second half symbol string 73 “EFGH” is displayed on the display section 40.

As shown in FIG. 3D, once the display switch section 44 is pressed again (for the third time) during the touch operation on the display section by the user, the control section 20 controls the display state of the to-be-deleted symbol string so that the to-be-deleted symbol string 71 (“ABCDEFGH”) is displayed in full again as shown in FIG. 3B.

As described above, the control section 20 repeatedly switches the display state of the to-be-deleted symbol string on the display section among a “second half hiding state”, a “first half hiding state”, and a “full display state” in the noted order every time the display switch section 44 is pressed during the touch operation on the display section 40 by the user.

When the user stops the touch operation (i.e., the user releases his/her finger from the touch position T), the touch sensor 42 detects the disappearance of the touch position T. Once the touch sensor 42 detects the disappearance of the touch position T, the control section 20 updates the storage section 30. As a result, the control section 20 keeps on displaying the symbol string displayed lastly on the display section 40.

As described above, the control section 20 specifies the to-be-deleted symbol string and the deletion reference position T based on the touch position T detected by the touch sensor 42, and switches the display state of the to-be-deleted symbol string on the display section to any one of the “second half hiding state”, the “first half hiding state”, and the “full display state” every time the display switch section 44 is pressed during the touch operation on the display section 40 by the user. Thus, a symbol string in a desired range can be deleted by simple operation.

In addition, when the touch sensor 42 detects the disappearance of the touch position, the control section 20 keeps on displaying the symbol string displayed lastly on the display section 40. Thus, a symbol string in a desired range can be deleted by simple operation.

Figure 4:
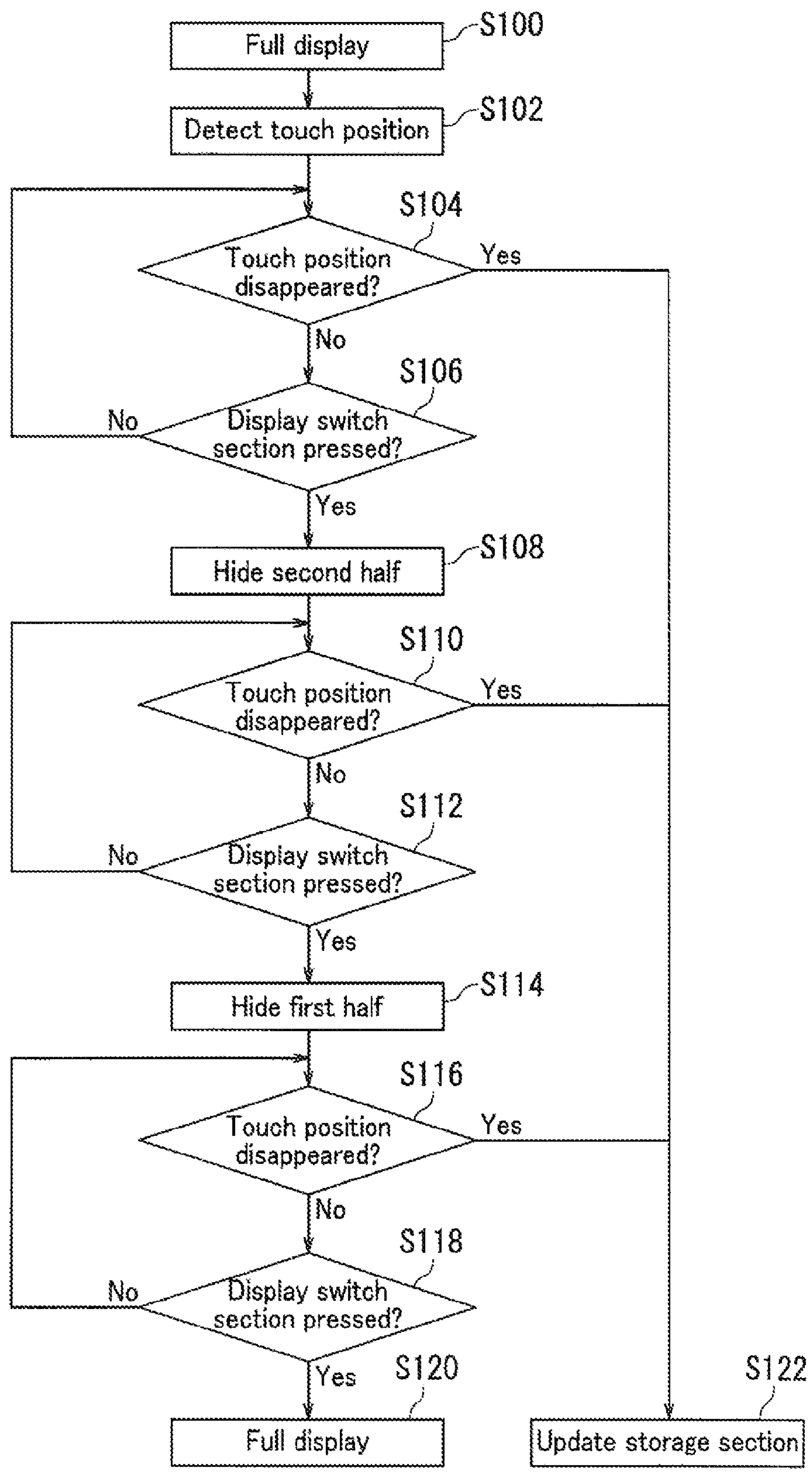
FIG. 4 is a flowchart showing a method for switching the display state in the input device according to the embodiment of the present disclosure.

The display state switching processing in the input device 10 according to the present disclosure will be described with reference to FIGS. 1 and 4. FIG. 4 is a flowchart showing the display state switching processing in the input device 10 according to the embodiment of the present disclosure.

Step S100: The display section 40 displays the symbol string in full. The display section 40 displays the symbol string stored in the storage section 30.

Step S102: The touch sensor 42 detects the touch position T. The control section 20 then specifies the to-be-deleted symbol string 71 and the deletion reference position based on the touch position T.

Step S104: The control section 20 determines whether or not the touch position T no longer exists. When the control section 20 determines that the touch position T no longer exists (Yes in Step S104), that is, when the touch sensor 42 detects the disappearance of the touch position T, then the display state switching processing flows to Step S122 in which the information of the symbol string stored in the storage section 30 is updated to the information of the symbol string being displayed on the display section 40. When the control section 20 determines that the touch position T still exists, (No in Step S104), that is, when the touch position T is still being detected by the touch sensor 42, then the display state switching processing flows to Step S106.

Step S106: The control section 20 determines whether or not the display switch section 44 has been pressed. When the control section 20 determines that the display switch section 44 has not been pressed (No in Step S106), then the display state switching processing flows back to Step S104. When the control section 20 determines that the display switch section 44 has been pressed (Yes in Step S106), then the display state switching processing flows to Step S108.

Step S108: The control section 20 switches the display state of the to-be-deleted symbol string 71 on the display section 40 to the second half hiding state.

Step S110: The control section 20 determines whether or not the touch position T no longer exists. When the control section 20 determines that the touch position T no longer exists (Yes in Step S110), that is, when the touch sensor 42 detects the disappearance of the touch position T, then the display state switching processing flows to Step S122 in which the information of the symbol string stored in the storage section 30 is updated to the information of the symbol string being displayed on the display section 40. When the control section 20 determines that the touch position T still exists, (No in Step S110), that is, when the touch position T is still being detected by the touch sensor 42, then the display state switching processing flows to Step S112.

Step S112: The control section 20 determines whether or not the display switch section 44 has been pressed. When the control section 20 determines that the display switch section 44 has not been pressed (No in Step S112), then the display state switching processing flows back to Step S110. When the control section 20 determines that the display switch section 44 has been pressed (Yes in Step S112), then the display state switching processing flows to Step S114.

Step S114: The control section 20 switches the display state of the to-be-deleted symbol string 71 on the display section 40 to the first half hiding state.

Step S116: The control section 20 determines whether or not the touch position T no longer exists. When the control section 20 determines that the touch position T no longer exists (Yes in Step S116), that is, when the touch sensor 42 detects the disappearance of the touch position T, then the display state switching processing flows to Step S122 in which the information of the symbol string stored in the storage section 30 is updated to the information of the symbol string being displayed on the display section 40. When the control section 20 determines that the touch position T still exists, (No in Step S116), that is, when the touch position T is still being detected by the touch sensor 42, then the display state switching processing flows to Step S118.

Step S118: The control section 20 determines whether or not the display switch section 44 has been pressed. When the control section 20 determines that the display switch section 44 has not been pressed (No in Step S118), then the display state switching processing flows back to Step S116. When the control section 20 determines that the display switch section 44 has been pressed (Yes in Step S118), then the display state switching processing flows to Step S120.

Step S120: The control section 20 switches the display state of the to-be-deleted symbol string 71 on the display section 40 to the full display state. Then, the display state switching processing flows back to Step S104 again.

Steps S104 to S120 are repeated until the touch position T no longer exists in the display state switching processing. Thus, the control section 20 repeatedly switches the display state of the to-be-deleted symbol string 71 on the display section 40 among the "second half hiding state", the "first half hiding state", and the "full display state" in the noted order every time the display switch section 44 is pressed. When the touch position T no longer exists, that is, when the touch sensor 42 detects the disappearance of the touch position T, the information of the symbol string stored in the storage section 30 is updated to the information of the symbol string being displayed on the display section 40.

Second Embodiment

Figure 5:
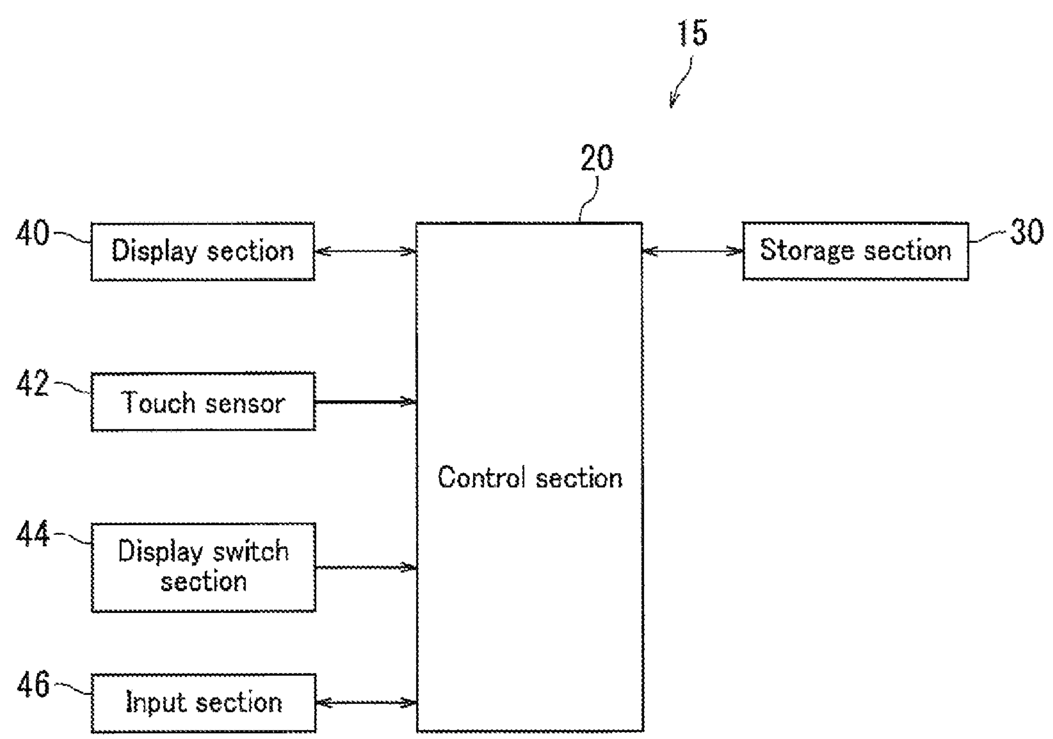
FIG. 5 is a block diagram showing an input device according to another embodiment of the present disclosure.

An input device 15 according to another embodiment of the present disclosure will be described with reference to FIG. 5. FIG. 5 is a block diagram showing the input device 15 according to another embodiment of the present disclosure.

The input device 15 includes the control section 20, the storage section 30, the display section 40, the touch sensor 42, the display switch section 44, and an input section 46. The input device 15 according to the present embodiment has the same configuration as the input device 10 described with reference to FIG. 1 except that the input device 15 further includes the input section 46. Accordingly, the same description will not be repeated.

The input section 46 enables a user to enter a symbol string. The display switch section 46 is a software keyboard, for example. A user can enter a symbol string by touching symbols of the software keyboard displayed on the display section 40. The control section 20 causes the storage section 30 to store the symbol string entered by the user. The control section 20 displays on the display section 40 the symbol string stored in the storage section 30.

Figure 6A:
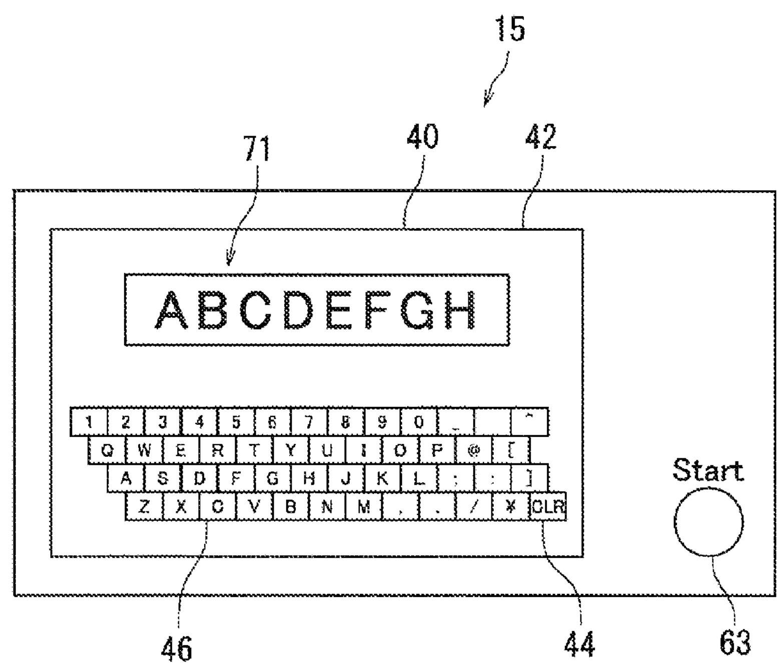
FIG. 6A is a schematic illustration showing the input device according to said another embodiment of the present disclosure.
Figure 6B:
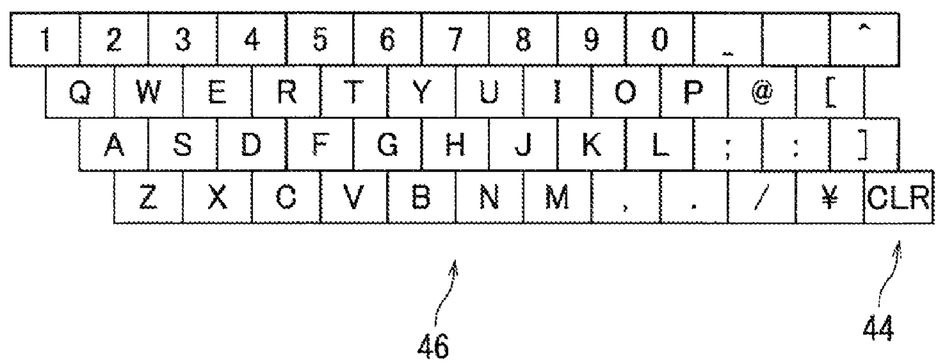
FIG. 6B is a schematic illustration showing an input section and a display switch section included in the input device according to said another embodiment of the present disclosure.

The input device 15 according to the embodiment of the present disclosure will be described with reference to FIGS. 5 and 6. FIG. 6A is a schematic illustration showing the input device 15 according to the present embodiment. FIG. 6B is a schematic illustration showing the input section 46 and the display switch section 44 included in the input device 15 according to the present embodiment. The input device 15 shown in FIG. 6A has the same configuration as the input device 10 shown in FIG. 2B except that the input device 15 further includes the input section 46. Accordingly, the same description will not be repeated.

The input device 15 includes the control section 20, the storage section 30, the display section 40, the touch sensor 42, the display switch section 44, and the input section 46.

The input section 46 is a software keyboard. The input section 46 is displayed on a display surface of the display section 40. Symbols in a keyboard-like arrangement are displayed in the input section 46. A user can enter a symbol string by touching symbols in the input section 46. In the present embodiment, the symbol string 71 "ABCDEFGH" entered by the user is displayed on the display section 40. The control section 20 switches the display state on the display section 40 every time the display switch section 44 is pressed during touch operation on the display section 40 by the user.

As described with reference to FIGS. 5 and 6, the input device 15 further includes the input section enabling a user to enter a symbol string. The display section displays the symbol string entered through the input section. Accordingly, the control section 20 switches the display state of the to-be-deleted symbol string, out of the symbol string entered through the input section, on the display section to any one of the "second half hiding state", the "first half hiding state", and the "full display state" every time the display switch section 44 is pressed during the touch operation on the display section 40 by the user. Thus, a symbol string in a desired range out of the symbol string entered by the user can be deleted by simple operation.

The control section 20 in the input devices 10 and 15 described with reference to FIGS. 1 to 6 specifies a full symbol string as the to-be-deleted symbol string; however, the present disclosure is not limited thereto. For example, the control section 20 may specify a sentence as a unit of the to-be-deleted symbol string. Alternatively, the control section 20 may specify a paragraph as a unit of the to-be-deleted symbol string. When a sentence is specified as a unit of the to-be-deleted symbol, the control section 20 specifies symbols between a symbol next to a full stop immediately before the deletion reference position T specified by the control section 20 and a full stop immediately behind the deletion reference position T, inclusive, as the to-be-deleted symbol string, for example. The control section 20 changes the unit of the to-be-deleted symbol string thereby to allow a user to delete characters as needed.

Third Embodiment

Figure 7:
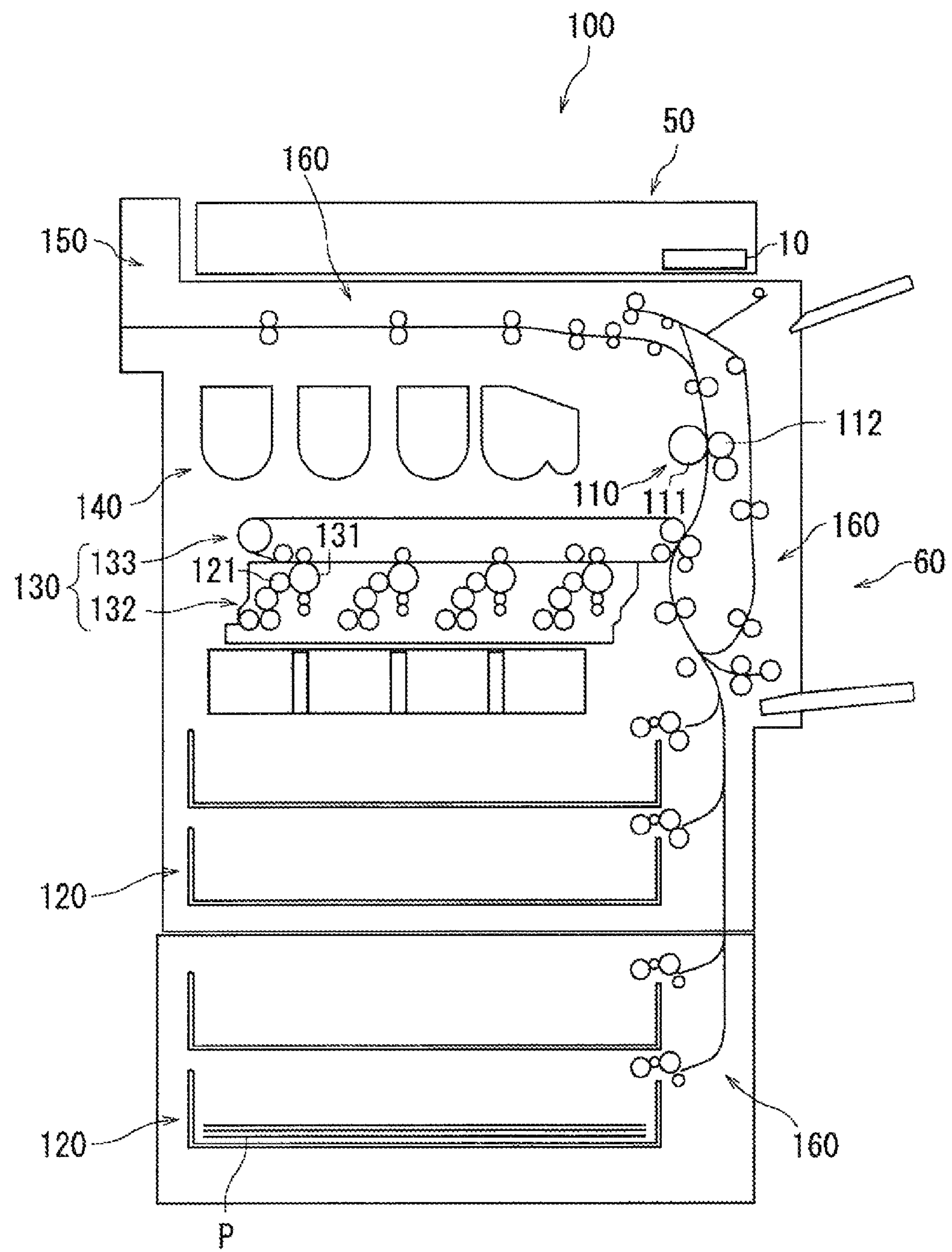
FIG. 7 is a schematic illustration showing an image forming apparatus according to still another embodiment of the present disclosure.

An image forming apparatus will be described with reference to FIG. 7 as an example of an electronic device according to the present disclosure. FIG. 7 is a schematic illustration showing an image forming apparatus 100 according to an embodiment of the present disclosure. The image forming apparatus 100 may be a copier, a printer, a facsimile machine, or a multifunction peripheral combining their functions.

The image forming apparatus 100 includes the input device 10, an image reading section 50, and an image forming section 60. The image forming section 60 includes a fixing device 110, a paper feed cassette 120, an imaging section 130, a toner replenishment device 140, a paper discharge section 150, and a paper conveyance section 160. The image forming apparatus 100 operates based on information input through the input device 10. For example, the image forming apparatus 100 transmits data read by the image reading section 50 to an e-mail address input through the input device 10. The image forming section 60 forms an image based on the image data read by the image reading section 50.

The paper feed cassette 120 accommodates paper P for printing. At the time of printing, the paper P in the paper feed cassette 120 is conveyed by the paper conveyance section 160 to go through the imaging section 130 and the fixing device 110 and discharged from the paper discharge section 150.

The imaging section 130 forms a toner image on the paper P. The imaging section 130 includes a plurality of photosensitive members 131, a plurality of developing devices 132, and a transfer device 133.

An electrostatic latent image is formed on each photosensitive member 131 by a laser scanned based on, for example, an electronic signal representing an original document image generated by the image reading section 50. Each developing device 132 includes a developing roller 121. Each developing roller 121 supplies toner to the corresponding photosensitive member 131 to develop the electrostatic latent image. As a result, a toner image is formed on each photosensitive member 131. The toner is supplied form the toner replenishment device 140 to each developing device 132.

The transfer device 133 transfers the toner images formed on the respective photosensitive members 131 to the paper P.

The fixing device 110 fuses the unfixed toner images formed by the imaging section 130 and fixes the toner images to the paper P by applying heat and pressure to the paper P with a fixing member 111 and a pressure member 112.

The present disclosure is not limited to the above-described embodiments and can be practiced in various ways without departing from the scope of the present disclosure. For example, the following alternations are possible.

(1) In the input devices described with reference to FIGS. 1 to 6, the control section 20 repeatedly switches the display state of the to-be-deleted symbol string on the display section among the "second half hiding state", the "first half hiding state", and the "full display state" in the noted order every time the display switch section 44 is pressed during touch operation on the display section 40 by a user; however, the order of the display state switching is not limited to the order of the "second half hiding state", the "first half hiding state", and the "full display state". For example, the control section 20 may switch the display state of the to-be-deleted symbol string on the display section among the "first half hiding state", the "second half hiding state", and the "full display state" in the noted order every time the display switch section 44 is pressed during touch operation on the display section 40 by a user.

(2) In the input devices described with reference to FIGS. 1 to 6, the control section 20 repeatedly switches the display state of the to-be-deleted symbol string on the display section among the "second half hiding state", the "first half hiding state", and the "full display state" in the stated order every time the display switch section 44 is pressed during touch operation on the display section 40 by a user; however, one of the "first half hiding state" and the "second half hiding state" may not be shown. For example, the control section 20 may repeatedly switch the display state of the to-be-deleted symbol string on the display section between the "first half hiding state" and the "full display state" in the noted order every time the display switch section 44 is pressed during touch operation on the display section 40 by a user. Alternatively, the control section 20 may repeatedly switch the display state of the to-be-deleted symbol string on the display section between the "second half hiding state" and the "full display state" in the noted order every time the display switch section 44 is pressed during touch operation on the display section 40 by a user.

Alternatively, the control section 20 may not switch the display state to the "full display state". For example, the control section 20 may alternately switch the display state of the to-be-deleted symbol string on the display section between the "second half hiding state" and the "first half hiding state" in the noted order every time the display switch section 44 is pressed during touch operation on the display section 40 by a user.

(3) In the input devices according to the embodiments described with reference to FIGS. 1 to 6, a symbol string of symbols presented in a horizontal direction is deleted; however, the presentation of the symbol string to be deleted in the input devices is not limited to the horizontal direction. For example, the symbol string to be deleted in the input devices may be presented in a vertical direction.

(4) The present disclosure has been described by taking an image forming apparatus as an example of the electronic device including the input device 10 with reference to FIG. 7; however, the electronic device including the input device 10 is not limited to the image forming apparatus. For example, the electronic device including the input device 10 may be a smart phone, a tablet computer, or a personal computer having a touch panel.

What is claimed is:

1. An input device comprising:

memory configured to store a symbol string including a plurality of symbols;

a display configured to display the symbol string stored in the memory;

a touch sensor configured to detect a touch position on the display;

a controller; and a software key or a hardware key, wherein the controller specifies a to-be-deleted symbol string and a deletion reference position based on the touch position detected by the touch sensor, the controller repeatedly switches the display state of the to-be-deleted symbol string on the display among a second half hiding state, a first half hiding state, and a full display state in the stated order or among the first half hiding state, the second half hiding state, and the full display state in the stated order every time the software key or the hardware key is pressed while the touch position detected by the touch sensor remains unchanged and the deletion reference position specified by the controller remains unchanged, the second half hiding state is to hide a second half symbol string, out of the to-be-deleted symbol string, displayed behind the deletion reference position, the first half hiding state is to hide a first half symbol string, out of the to-be-deleted symbol string, displayed before the deletion reference position, and the full display state is to display the to-be-deleted symbol string in full.

2. An input device according to claim 1, wherein the controller keeps on displaying the symbol string displayed lastly on the display when the touch sensor detects disappearance of the touch position.

3. An input device according to claim 1, further comprising:

a software keyboard configured to enable a user to enter a symbol string, wherein the display displays the symbol string entered through the software keyboard.

4. An input device according to claim 1, wherein the controller specifies a sentence, a paragraph, or a full symbol string as a unit of the to-be-deleted symbol string.

5. An electronic device comprising an input device according to claim 1.

* * * * *